Dec. 27, 1932.     G. O. HILLIER     1,892,306
FILTER
Filed Oct. 13, 1930     3 Sheets-Sheet 1

INVENTOR.
Gerald. O. Hillier.
BY
ATTORNEYS.

Dec. 27, 1932.   G. O. HILLIER   1,892,306
FILTER
Filed Oct. 13, 1930   3 Sheets-Sheet 2
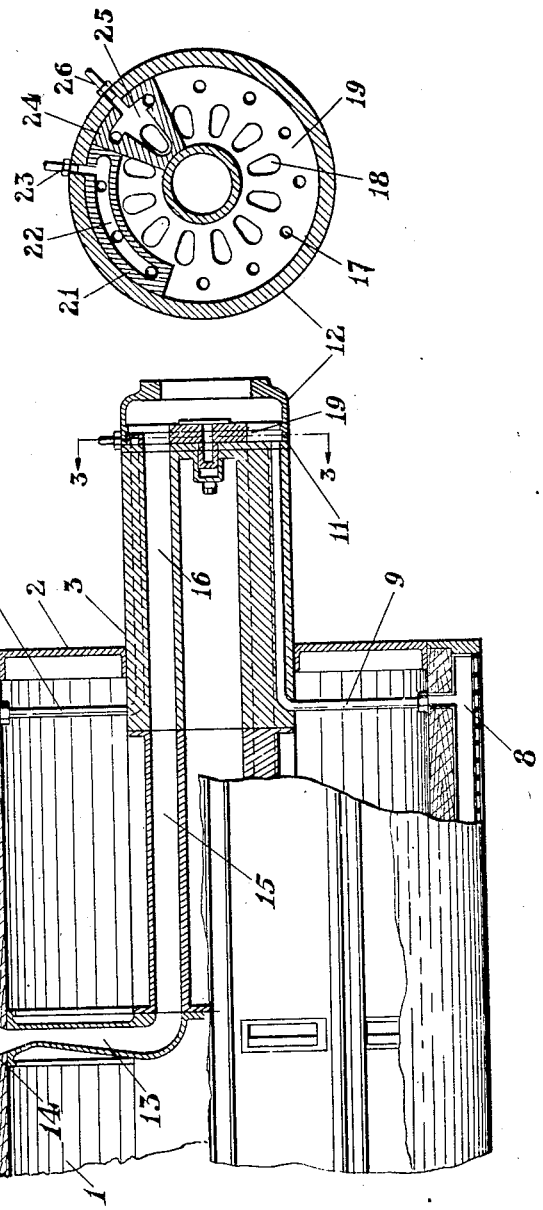
INVENTOR.
Gerald. O. Hillier
BY
ATTORNEYS.

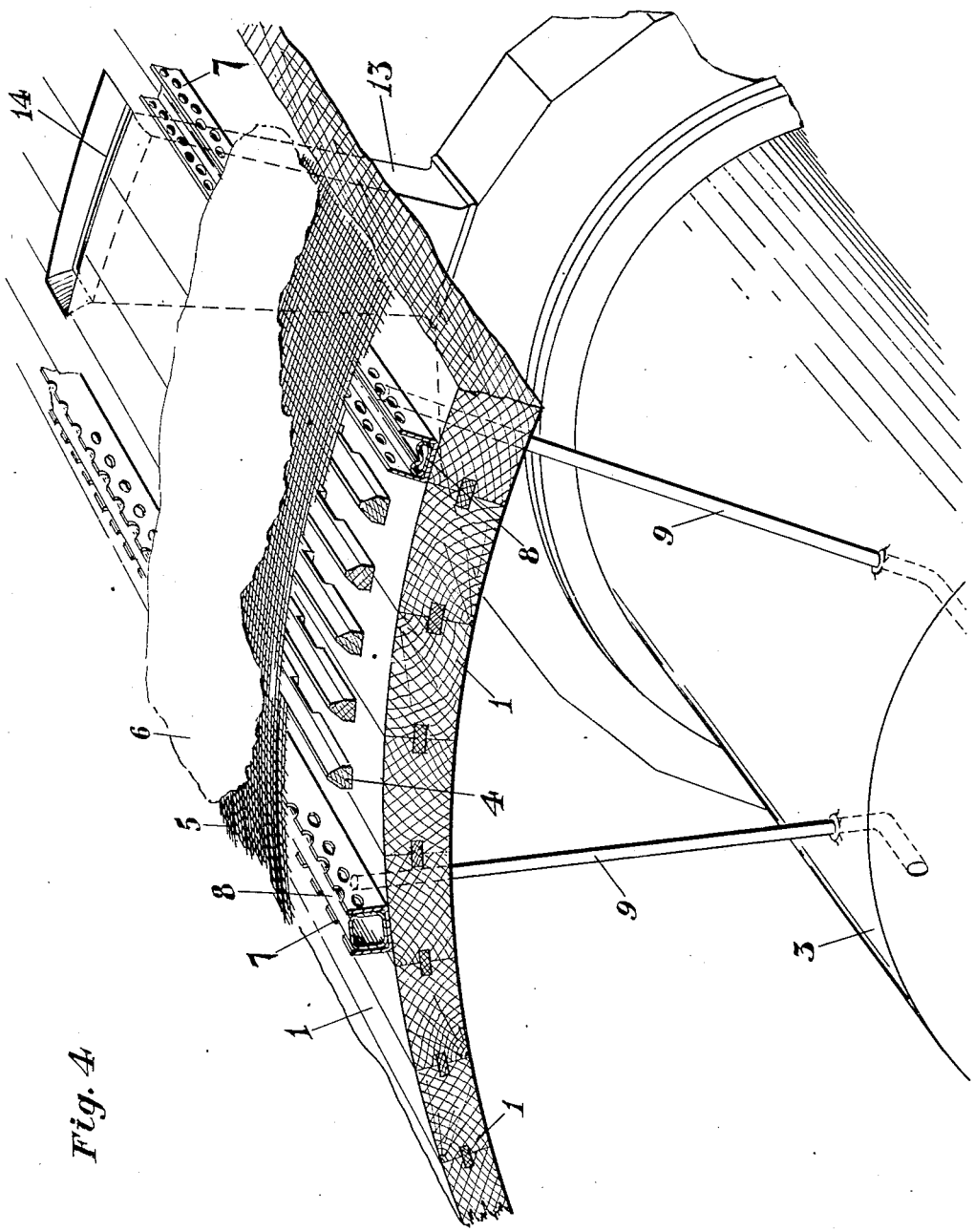

Patented Dec. 27, 1932

1,892,306

UNITED STATES PATENT OFFICE

GERALD O. HILLIER, OF BERKELEY, CALIFORNIA, ASSIGNOR TO OLIVER UNITED FILTERS INC., OF SAN FRANCISCO, CALIFORNIA, A CORPORATION OF NEVADA

FILTER

Application filed October 13, 1930. Serial No. 488,382.

This invention relates to filters and particularly to continuous filters of both the rotary drum and disc type.

Continuous rotary drum filters consist briefly of a tank or vat in which is made to rotate a drum having a periphery covered with a filtering medium and on which a cake of the material to be filtered is deposited due to the action of a differential pressure on the filtering medium while passing through the tank.

A rotary disc filter as its name implies consists of a plurality of discs mounted on a horizontal shaft and rotating in a tank. Each face of each disc is covered with a filter medium on which a cake is deposited due to the action of a differential pressure on the filtering medium as the discs pass through the pulp contained in the tank.

The successful operation of both of these types of filters depends upon the fact that although called continuous filters they actually consist of a continuous series of separate and independent filters. In the case of a rotary drum filter the cylindrical filter surface or area is divided into sections or compartments by what are known as division strips, each section communicating with a valve seat which rotates in contact with a stationary valve head. The valve head is in turn placed in communication with vacuum and pressure pumps so that each section or compartment of the drum can be successively placed in communication with a source of reduced pressure and with what is known as a blow-back.

In a similar manner each face of each disc of a rotary disc filter is made up of sectors each of which may be successively placed in communication with vacuum and pressure pumps by any suitable valve mechanism. The construction of filters as above described is such that usually there are several sections or sectors submerged within the material to be filtered at any given time and although each section or sector in effect constitutes a separate filter it has been found that the differential pressure acting on any one section or sector is to some extent effective in building up a cake slightly overlapping the adjacent section.

To better illustrate this action it may be well to consider the continuous formation of cake on the periphery of a rotary drum filter. As soon as any given section is completely submerged in the material being filtered it is placed under the influence of a differential pressure which effects the formation of a cake on its surface. This cake as above stated extends somewhat beyond the division strips dividing the section on both the forward and rear edges of the section. It will be seen therefore that before the next succeeding section is placed under the influence of a vacuum its leading edge is already covered with a narrow strip of cake and as soon as vacuum is applied to this second section the cake formed on the first section is continued on the second section substantially without any break due to the presence of the intervening division strip. In this manner the cake which is continuously deposited on the periphery of the drum is made continuous as each succeeding section is placed under the influence of a vacuum. This action of course depends on the use of rather narrow division strips. If division strips having any appreciable width were to be used the cake would be picked up and discharged in separate and distinct slabs.

For most purposes it is immaterial whether the cake is formed as a continuous layer or whether it is formed as separate and distinct slabs defined by the division strips separating each filter section or compartment. Recently however it has been found desirable to use rotary drum filters as board forming machines for the formation of continuous sheets of paper and insulating board. In the application of rotary drum filters to this type of work it has been found that the division strips, although essential to the successful operation of such filters, result in the formation of weakened zones or lines. Boards or sheets formed on this type of equipment are objectionable not only because of the weakened zones or lines corresponding to the division strips of the filter but are also objectionable due to the fact that these weakened zones are evidenced by water marks or slight depressions. That these weakened zones are definitely attributable to the effect of the division strips is unquestionable and experiments have shown that they are probably due to the action of the division strips during the cake forming period rather than to the cake washing or drying periods. They furthermore appear to be due to the restraining or blocking action of the division strips to the action of the differential pressure directly above the division strips. In other words the action of the differential pressure or vacuum is not uniform from one section to the next succeeding section due to the restraining effects of the division strips.

From the above consideration it seems desirable to either distribute the action of the division strips over an increased area or in some manner to do away altogether with their action during the cake forming period.

In some instances however it may be desirable to eliminate the effects of the division strips not during the cake forming period but during the cake washing and drying period.

Furthermore the presence of division strips during the cake forming period is objectionable in as much as their restraining action decreases the capacity of the filter.

In general then the object of this invention is the provision of distensible division strips for continuous rotary filters whereby such division strips may be made ineffective during a portion of each cycle of operation.

More specifically the object of this invention is the provision of distensible division strips for continuous filters, pneumatically operated in coordination with the cycle of operation of the filter.

The invention possesses other advantageous features, some of which with the foregoing, will be set forth at length in the following description where I shall outline in full that form of my invention which I have selected for illustration in the drawings accompanying and forming part of the present specification. In said drawings, I have shown the application of my invention to a rotary drum filter, but it is to be understood that I do not limit myself to such form, since the invention as set forth in the claims, may be embodied in many other forms of filters such as for example internally fed rotary drum filters and rotary disc filters.

Referring to the drawings:

Figure 2 is a fragmental elevation partly in section of the drum of a rotary drum filter provided with distensible division strips as diagrammatically indicated in Figure 1.

Figure 3 is an enlarged section of the valve head and seat shown in Figure 2, taken on the line 3—3 of Figure 2 and looking in the direction indicated by the arrows.

Figure 4 is a fragmental perspective view of a drum of a rotary drum filter having some of its parts broken away in order to better illustrate its construction and operation.

Figure 1:
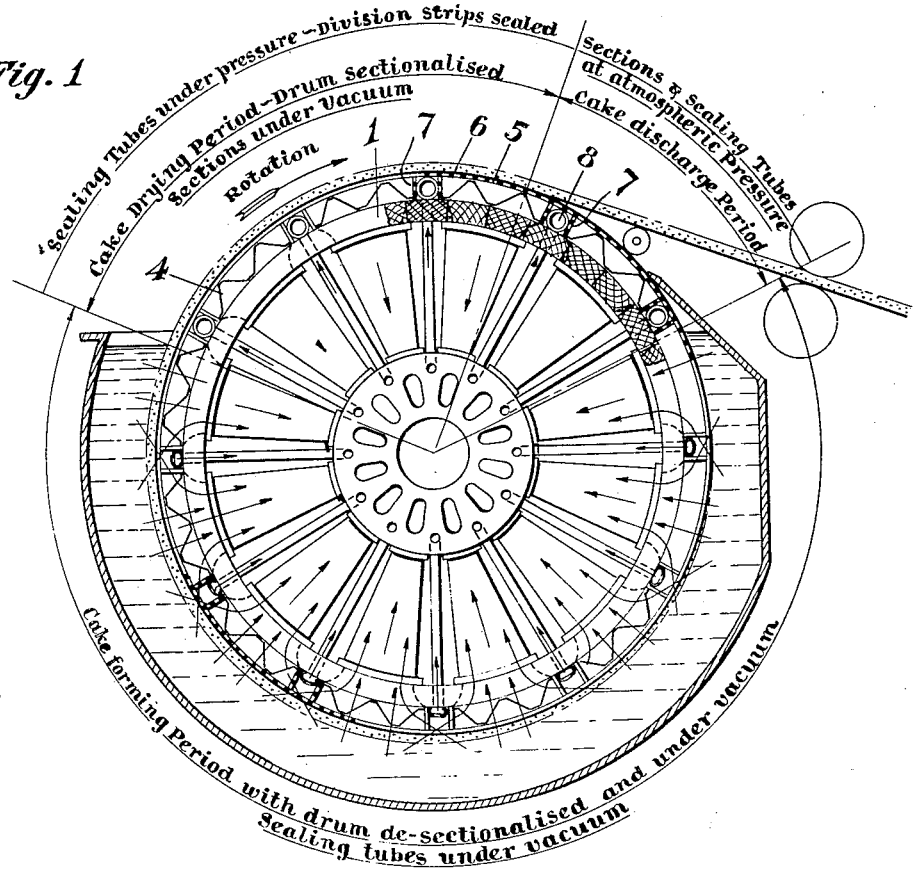
Figure 1 is a diagrammatic view of a rotary drum filter provided with distensible rubber tube division strips.

Although the distensible division strips of my invention are applicable to rotary disc filters and internally fed rotary drum filters as well as externally fed rotary drum filters, at the present time they find their greatest application in connection with the latter type and therefore the greater part of this description will be devoted to a disclosure of the construction and operation of this type.

The rotary drum filter shown in Figs. 1, 2, 3, and 4 comprises a cylindrical wooden shell 1 the ends of which are closed and supported by drum heads 2 which in turn are rigidly secured in any suitable manner to trunnions 3.

Although not shown the trunnions are adapted to be journaled in bearings customarily secured to and supported by the filter tank or vat. Secured to the outer periphery of the shell 1 is a supporting grating or drainage member 4 (Fig. 1) which serves to hold a supporting screen 5 in spaced relation with respect to the shell 1 and disposed over and secured to this supporting screen is a filter cloth 6.

The annular space or compartment formed between the shell 1 and the supporting screen 5 is divided into any desired number of sections by means of perforated channel shaped members or cages 7 and although they serve to define distinct sections or compartments it is to be noted that they do not and should not of themselves materially restrict the free passage of air or liquid from one section or compartment to another.

Housed within the channel shaped members 7 and secured to the base thereof are distensible rubber tubes 8 sealed at each end and having communication by means of pipes 9 with a valve seat 11, which in turn is associated with a valve head 12. By suitably designing the ports on the valve seat and valve head the distensible rubber tubes 8 may be automatically inflated or deflated in any desired sequence to thereby seal any given compartment from its adjacent compartment. The sealing of one compartment from another is accomplished by the inflation or distension of the intervening rubber tube division strip against the bottom of the channel shaped member within which it is housed as well as against the supporting screen 5. When a vacuum is applied to any one of the division strips 8 it collapses due to the action of the external atmospheric pressure and in so doing permits the unrestrained passage of gas and liquid between the two sections which it divides. Each section or compartment defined by any two adjacent division strips communicates by means of conduits 13 registering with openings 14 cut in the shell 1, and conduits 15 and 16, with the valve seat 11.

Although the construction and operation of a valve such as used on continuous filters is well known in the industry, the construction and operation of the valve herein shown will be described in order to make perfectly clear the operation of the distensible division strips embodying my invention. Briefly this valve consists of a wear plate or valve seat 11 secured to and rotating with the trunnion 3 and provided with ports 17 and 18 which register respectively with the pipes 9 and conduits 16. The valve seat 11 rotates against the face of the stationary valve seat 12 which is supported in any suitable manner by the frame of the filter. In this particular instance Figure 3, which it is to be remembered is a section taken on the line 3—3 of Fig. 2 and looking in the direction as indicated by the arrow, shows seven of the twelve ports 17 of the valve seat 11, in communication with a space 19 in the valve seat 12, which communicates with a vacuum pump.

As shown in Fig. 1 these particular seven ports are in communication with sections or compartments that are submerged within the material or pulp under treatment and therefore are successively passing through what is known as the "cake forming" period. As each section successively emerges from the pulp within the tank its corresponding port 17 comes into engagement with a bridge 21 provided with a slot 22, which in turn communicates thru a fitting 23 with any suitable source of pressure. It will therefore be seen that as the ports 17 successively come into communication with the slot 22, the corresponding distensible division strips 8 are inflated to thereby successively seal each compartment as it emerges from the pulp.

In the meantime the ports 18, like ports 17, are in communication during a part of their rotation with the space 19, which as above stated connects with a vacuum pump. During this interval the sections or compartment in communication with the ports 18 are therefore under the influence of vacuum or a differential pressure. It is to be noted however that the ports 18 are in communication with a source of vacuum not only during the corresponding interval during which the ports 17 are under its influence, but as indicated in both Figs. 1 and 3, they are under the influence of a vacuum for a much longer period. As a mater of fact each section is under the influence of vacuum during the cake forming, washing and drying periods. To aid in discharging the cake each section which has arrived at that stage of operation, is subject to a blow back or reverse pressure. This is effected by means of a bridge 24 provided with a slot 25. The slot 25, like the slot 22, is placed in communication by means of a fitting 26 with any suitable source of pressure. Each section is therefore subjected during the major portion of its cycle to the action of vacuum effective during the cake forming, washing and drying periods and is then subjected to the action pressure to aid in discharging the cake by loosening it from the filter medium. During the cake forming period the submerged division strips are maintained, by the action of vacuum, in a deflated condition, permitting the submerged portion of the filter area to act as a single section and thereby permitting a uniform cake formation devoid of any weakened zones or water marks as ordinarily formed by division strips now in use.

For board forming purposes it is desirable merely to seal that portion of the filter being discharged from the remaining portion, that is the cake forming, cake washing and cake drying portion. The portion of the drum other than that being discharged may be permitted to act as a single section or compartment by deflating the division strips. However the valve construction as shown in Fig. 3 is such as to not only seal or sectionalize that portion of the drum being discharged but also effects the sectionalization or sealing of the three preceding sections. In practice this appears to be desirable in order to insure that the blow back or reverse discharge pressure to which the section being discharged is subjected, is not allowed to leak through to the section on which cake is being formed.

In the filtration of some types of materials it is desirable to separate the filtrate from the wash water and in such cases suitable well known changes have to be made in the filtrate valve which need not be here explained.

Figure 5:
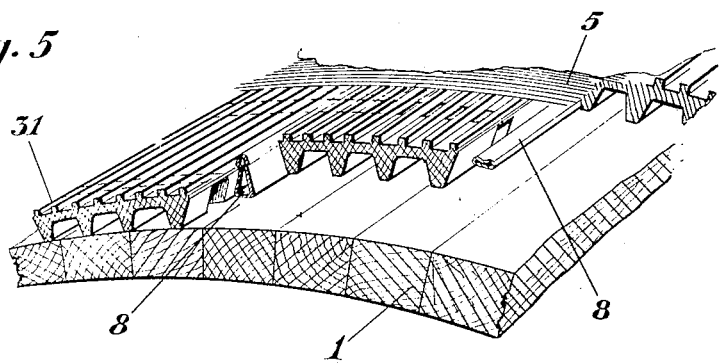
Figure 5 is a fragmental perspective view of the drum of a rotary drum filter provided with wooden drainage members with which are associated distensible division strips.

In Fig. 5 a modified form of drum construction is shown wherein the drum shell 1 and the supporting screen 5 are maintained in spaced relation by means of a wooden grille or drainage member 31 formed in sections corresponding to the filter sections or compartments. Secured and housed within the triangular shaped channels formed by the undercut faces of adjacent drainage sections 5, are distensible division strips 8, which as in the modification above described, communicate with suitable sources of vacuum and pressure. The inflation of any given division strip serves to definitely separate its two adjacent compartments. It is to be particularly noted that these drainage members provide an absolutely uniform surface on which the supporting screen 5 may be secured and that when the division strips are deflated the formation of cake on the filter medium should be absolutely uniform.

In Fig. 1 I have shown, in a diagrammatic way, the cycle of operation used in the formation of insulating board. The gradual formation of the cake or board is shown on the submerged, desectionalized portion of the drum, the arrows indicating the direction of travel of the filtrate. It will be noted that the cake is dried and discharged on and from a portion of the drum which has been sectionalized.

From the above disclosure it will be seen that I have provided a distensible division strip which can be associated with any type of continuous filter and by the use of which the filter compartment or area can be periodically sectionalized and desectionalized during any part of the cycle of operation as desired.

I claim:

1. In a continuous filter having a substantially endless filtering area, division strips comprising collapsible tubes for sectionalizing and desectionalizing said filtering area.

2. In a continuous rotary drum filter, means comprising distensible division strips for sectionalizing and desectionalizing said filter in any predetermined manner.

3. A multiple section rotary drum filter provided with movable division strips for sealing adjacent sections from each other to form separate compartments as desired.

4. A multiple section rotary drum filter provided with distensible division strips for sealing adjacent sections from each other to form separate compartments.

5. A multiple section rotary drum filter provided with distensible division strips for sealing adjacent sections from each other to form separate compartments, and means for effecting their operation in cyclic order.

6. In a continuous filter having a substantially endless filtering area, means comprising distensible division strips for sectionalizing and desectionalizing said filtering area in any predetermined manner.

7. In a continuous filter having a substantially endless filtering area, means for sectionalizing and desectionalizing said filtering area in a predetermined manner comprising collapsible division strips and means for subjecting any existing section to any desired pressure above or below atmospheric.

8. In a continuous filter having a substantially endless filtering area means for sectionalizing and desectionalizing said filtering area comprising collapsible division strips adapted to be inflated and deflated, and means for subjecting any existing section to any desired pressure above or below atmospheric.

9. In a continuous rotary drum filter, means for sectionalizing and desectionalizing said filter comprising collapsible division strips adapted to be inflated and deflated and means for subjecting any section formed by two inflated strips to any desired pressure above or below atmospheric.

10. A multiple section rotary drum filter provided with pneumatically operated distensible division strips and valve means for successively and periodically distending said division strips to seal adjacent sections from each other.

11. A rotary drum filter provided with a substantially endless filtering area divided into sections defined by distensible division strips and means for successively distending said strips to seal one section from another.

12. A filter comprising an endless surface covered with a filter medium, drainage spaces beneath the filter medium, spaced distensible division strips for sealing any two adjacent drainage spaces from each other and means for periodically distending said division strips during a portion of each cycle of operation.

13. A rotary drum filter comprising a substantially endless filter compartment covered with an endless filter medium, distensible division strips secured in spaced relation within said compartment and means for periodically distending each of said division strips.

14. A rotary drum filter comprising a substantially endless filter compartment covered with an endless filter medium, distensible division strips secured in spaced relation within said compartment and means for successively and periodically distending each of said division strips.

15. A rotary drum filter comprising a substantially uninterrupted annular filter compartment covered with a substantially endless filtering medium, distensible division strips secured in spaced relation within said compartment and automatic means for periodically distending each of said division strips to definitely sectionalize said compartment in any predetermined manner.

16. A rotary drum filter comprising a substantially uninterrupted annular filter compartment covered with a substantially endless filtering medium, distensible division strips secured in spaced relation within said compartment and automatic means for periodically and successively distending said division strips to definitely sectionalize said compartment in any predetermined manner.

17. A filter comprising a rotating element covered with a filter medium, drainage spaces beneath said filter medium, distensible partitions to subdivide the drainage spaces into separate compartments, and means for actuating the distensible partitions in relation to the opening and closing of ports in a filtrate valve associated with the filter.

18. A rotary drum filter comprising a substantially endless filter compartment covered with an endless filter medium, perforated cages secured in spaced relation within said compartment, distensible division strips secured within said cages and means for periodically distending each of said division strips.

19. In a continuous filter having a substantially endless filtering area, cages secured in spaced relation within said filtering area, means comprising distensible division strips for sectionalizing and desectionalizing said filtering area and means for subjecting any existing section to any desired pressure above or below atmospheric.

In testimony whereof, I have hereunto set my hand.

GERALD O. HILLIER.